United States Patent [19]

Blanchet

[11] Patent Number: 5,453,649
[45] Date of Patent: Sep. 26, 1995

[54] DRIVE UNIT FOR A WINDSHIELD WIPER IN A MOTOR VEHICLE

[75] Inventor: Pierre Blanchet, Lencloitre, France

[73] Assignee: Valeo Systemes D'Essuyage, Montigny-le-Bretonneeux, France

[21] Appl. No.: 169,162

[22] Filed: Dec. 17, 1993

[30] Foreign Application Priority Data

Dec. 12, 1992 [FR] France .................. 92 15239

[51] Int. Cl.[6] .................. H02K 5/00; H02K 11/00; H02K 13/00
[52] U.S. Cl. .................. 310/71; 310/83; 310/89
[58] Field of Search .................. 310/80, 83, 89, 310/68 R, 71, 51, 42, 43

[56] References Cited

U.S. PATENT DOCUMENTS

| | | | |
|---|---|---|---|
| 4,673,853 | 6/1987 | Tsunoda et al. | 318/443 |
| 5,063,317 | 11/1991 | Bruhn | 310/91 |
| 5,089,736 | 2/1992 | Oyafuso | 310/90 |
| 5,140,207 | 8/1992 | Baumeister et al. | 310/83 |
| 5,194,769 | 3/1993 | Ade et al. | 310/51 |
| 5,218,255 | 6/1993 | Horiguchi | 310/71 |
| 5,256,921 | 10/1993 | Pruis et al. | 310/68 B |
| 5,309,053 | 5/1994 | Ade | 310/71 |
| 5,331,257 | 7/1994 | Materne et al. | 318/85 |

FOREIGN PATENT DOCUMENTS

| | | |
|---|---|---|
| 2527855 | 2/1983 | France . |
| 906842 | 9/1989 | Germany . |
| 116791 | 11/1992 | Germany . |
| 2216981 | 10/1989 | United Kingdom . |
| 910652 | 11/1989 | WIPO . |
| 213381 | 8/1992 | WIPO . |

OTHER PUBLICATIONS

Derwent Abstract of FR 2527855.

*Primary Examiner*—Steven L. Stephan
*Assistant Examiner*—D. R. Haszko
*Attorney, Agent, or Firm*—Morgan & Finnegan

[57] ABSTRACT

The invention proposes a drive unit for a windshield wiper in a motor vehicle, of the kind including an electric motor disposed in a motor housing open at one of its axial ends, a blade-carrier support disposed inside the motor housing close to its open end, a reduction gear mechanism disposed in a reduction gear housing, one portion of which forms an end plate for closing the open end of the motor housing, and of the kind comprising electrical connection for the drive unit which include electric contacts which are accessible from outside the drive unit; wherein the electric contacts and the blade-carrier support are arranged in a connection module disposed inside the motor housing close to the open end thereof, and the closing end plate includes a window open to the outside of the reduction gear housing and which extends opposite the electric contacts of the connection module.

17 Claims, 3 Drawing Sheets

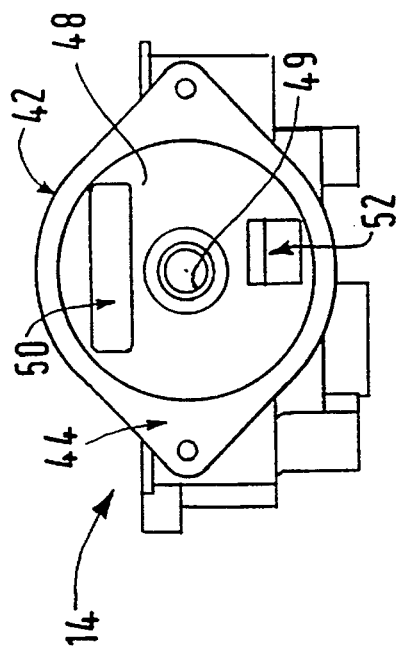
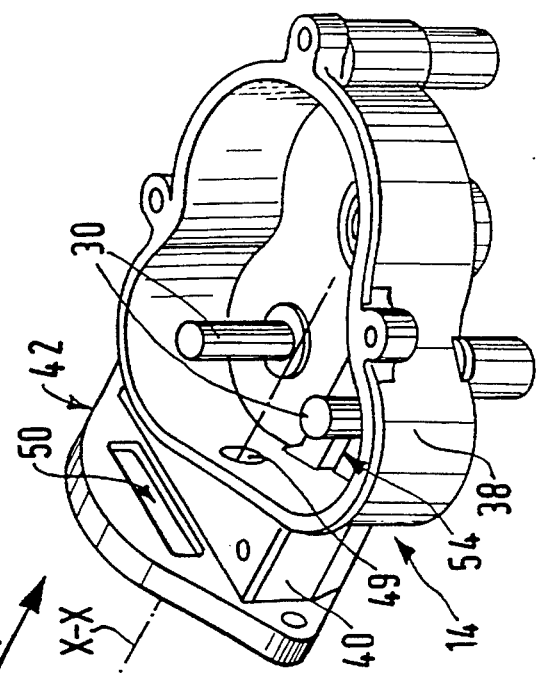
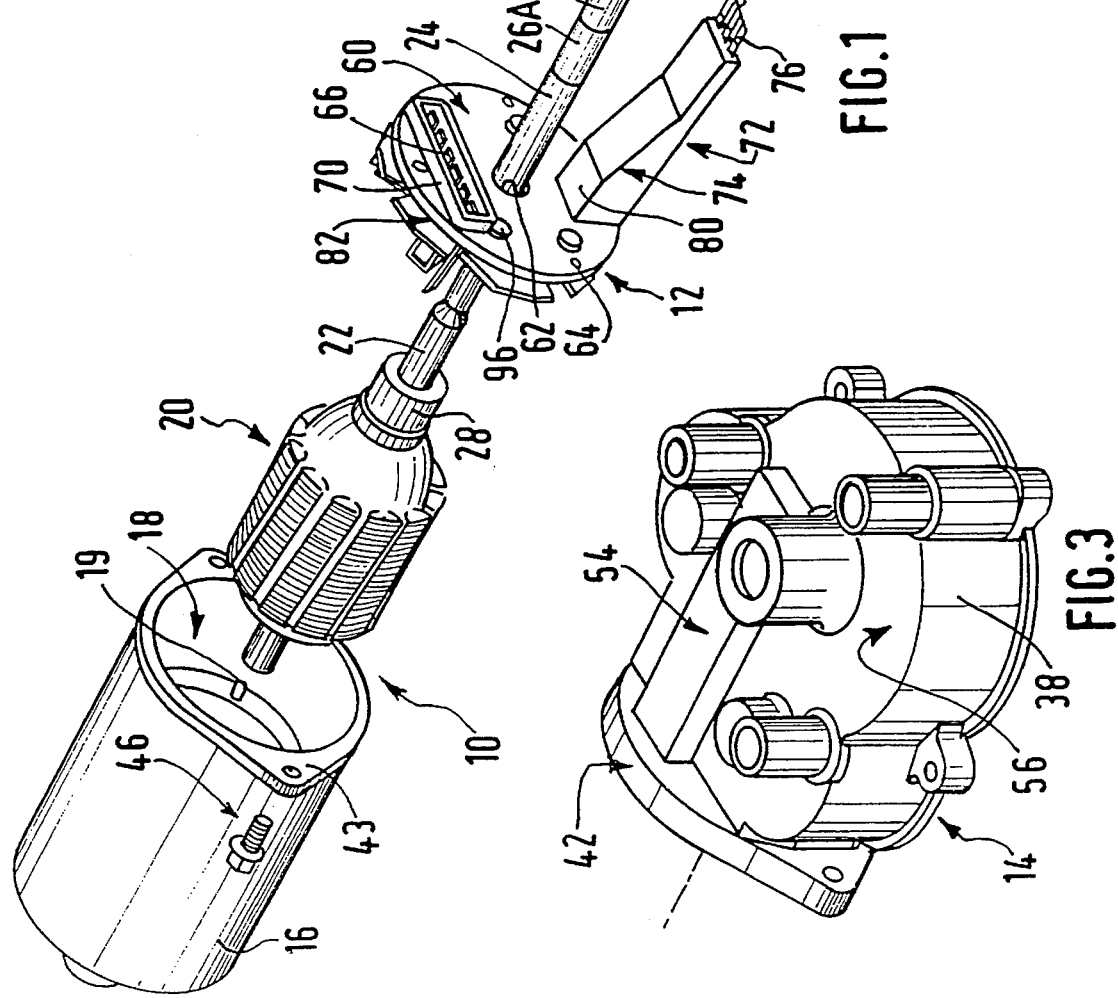

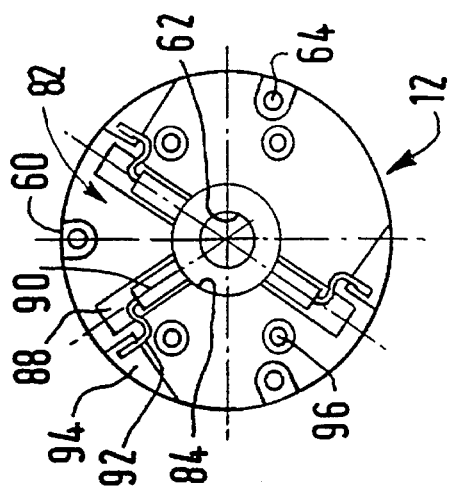
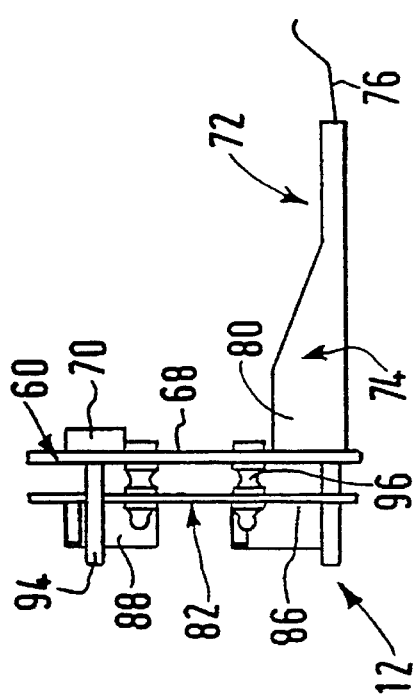
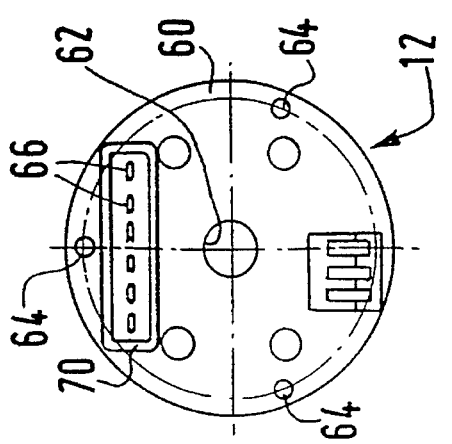
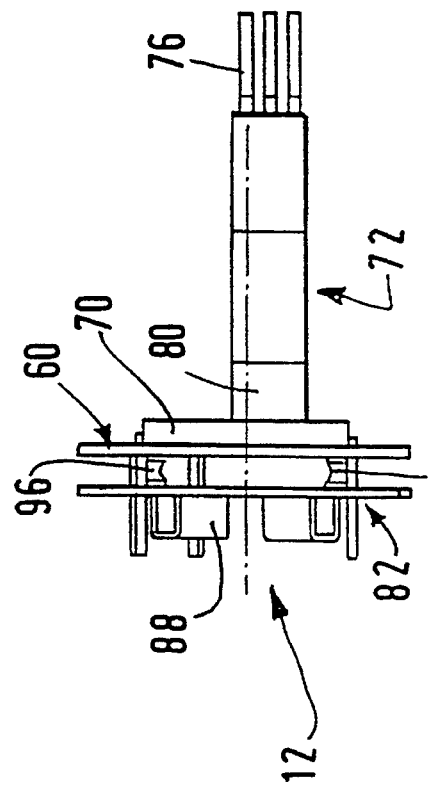

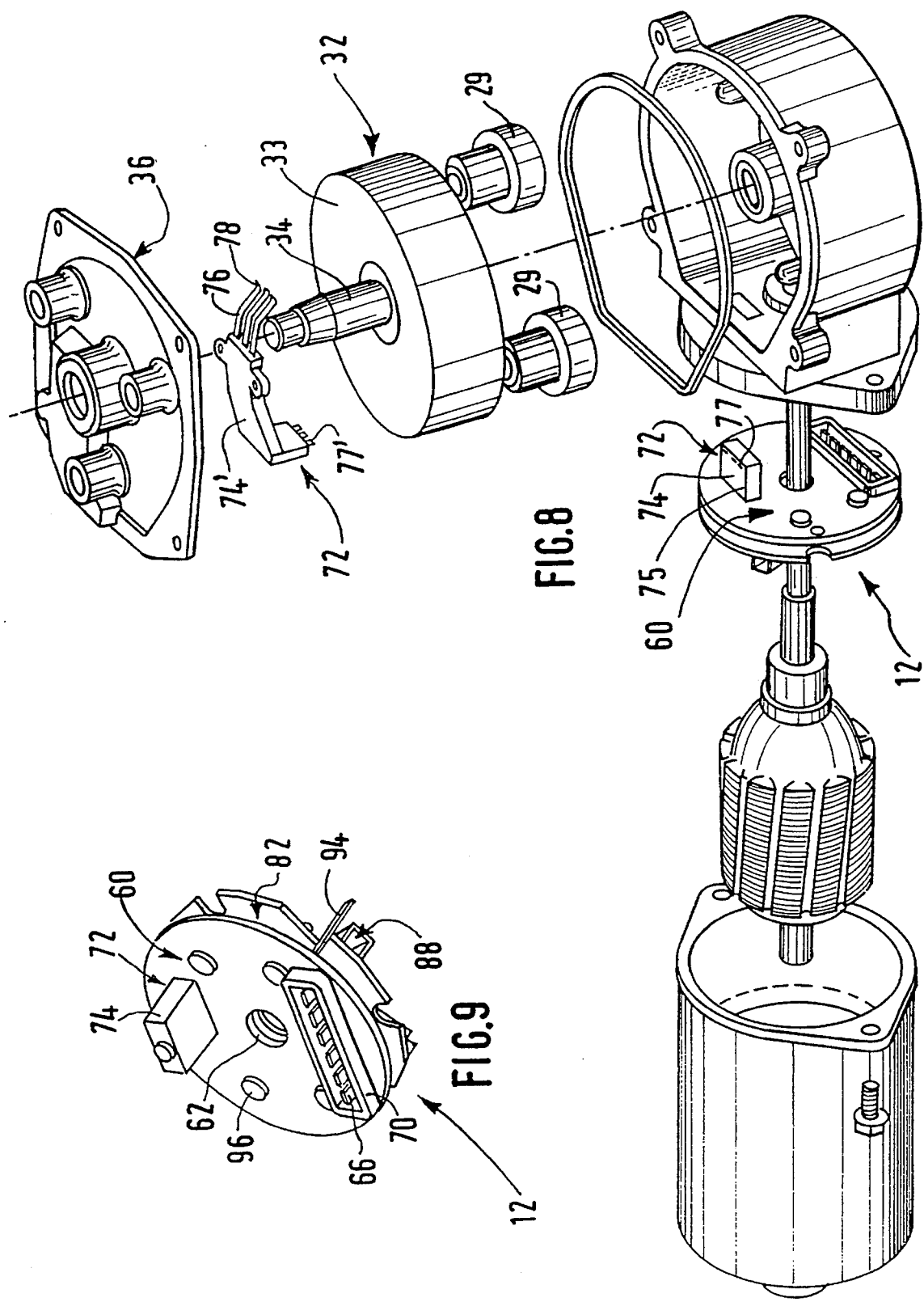

5,453,649

DRIVE UNIT FOR A WINDSHIELD WIPER IN A MOTOR VEHICLE

FIELD OF THE INVENTION

The present invention relates to a drive unit for a windshield wiper in a motor vehicle.

The invention more particularly relates to a drive unit of the kind comprising an electric motor disposed in a motor housing open at one of its axial ends, a blade-holder support disposed inside the motor housing close to its open end, of the kind comprising a reduction gear mechanism disposed in a reduction gear housing, one portion of which forms an end plate closing the open end of the motor housing, and of the kind comprising drive unit electrical connection means which in particular comprise electric contacts accessible from outside the drive unit.

BACKGROUND OF THE INVENTION

Different embodiments of such a drive unit are known from the Prior Art.

This is for example the case with the drive unit described in document FR-A-2,449,006, in which the blade support member is a blade-carrier plate disposed around the header of the motor and in which the electrical connection means are provided in the form of an independent element of the motor housing and of the reduction gear housing which is disposed laterally in the corresponding portions of the walls of these two components in the form of a connector element, the metal conductive parts of which extend in different directions to be connected firstly to the blade-carrier plate and secondly to the interior of the reduction gear housing. This solution is not satisfactory as its assembly is particularly complex and its structure does not enable the different electrical connections to be simply produced between the connector in the proper sense of the word and the internal elements of the unit to which it is connected.

Another solution is described in FR-A-2,527,855 in which the blade-carrier plate forms with the electrical connection connector a single piece which is formed as a cover part of the reduction gear housing.

This solution is not satisfactory either as this single piece has a very complex shape, is difficult to produce and requires, for example in order to change one of the toothed wheels of the reduction gear mechanism, the whole unit to be dismantled in order to remove the single complex piece.

DISCUSSION OF THE INVENTION

The object of the present invention is to provide a drive unit of the kind referred to above, which has a simple design, is easy to assemble, and which enables a great modularity for the mass production of units which are adapted to meet the requirements of motor vehicle manufacturers.

To achieve this object, the invention provides a drive unit characterised in that the electric contacts and the blade-carrier support are arranged in a connection module disposed inside the motor housing close to the open end thereof, and in that the end plate comprises a window open to the outside of the reduction gear housing and which extends opposite the electric contacts of the connection module.

According to other characteristics of the invention:

the electric contacts form part of an electrical connection element of the connection module, one lateral wall of which forms a connector housing and extends through the window in the end plate;

the connection module comprises a sensor which cooperates with a revolving member of the reduction gear mechanism and the sensor body of which is carried by the connection module;

the end plate is in the form of a partition in which an aperture is formed for the passage of the sensor body;

the sensor comprises conductive elements;

the connection module comprises a connection plate made from insulating material;

the connection plate is an intermediate plate disposed between the end plate of the motor housing and a parallel blade-carrier plate;

the blade-carrier plate is fixed to the connection plate by vibration damping means;

the connection plate comprises means for its attachment to the motor housing;

the connection plate is made by moulding from plastics material;

the electric contacts are made in the form of inserts embedded during the moulding of the intermediate plate;

the connector housing is made integral with the connection plate;

the body of the sensor is made integral with the connection plate;

the conductive elements of the sensor are formed at least partially in the form of inserts embedded during the moulding of the sensor;

the conductive elements are conductive blades which extend transversally from the connection plate, which protrude into the sensor of the reduction gear and the free ends of which cooperate with conductive strips formed on one radial face of the rotating member of the reduction gear mechanism;

the sensor is an electromagnetic sensor;

the sensor comprises a first sensor element carried by the connection module and a second sensor element, disposed inside the reduction gear housing, and detachably fixed to the first sensor element.

Other characteristics and advantages of the invention will become apparent from reading the following detailed description, for the understanding of which reference should be made to the attached drawings.

BRIEF DESCRIPTION OF THE DRAWINGS

FIG. 1 is a diagrammatical view of an exploded perspective of a first embodiment of a drive unit in accordance with the teachings of the invention;

FIG. 2 is a lateral view, along arrow F in FIG. 1, of the reduction gear housing;

FIG. 3 is a perspective view from below of the reduction gear housing;

FIG. 4 is a lateral view in elevation of the connection module of the drive unit illustrated in FIG. 1;

FIGS. 5 and 6 are lateral right-hand and left-hand views of the connection module of FIG. 4;

FIG. 7 is a view from below of the connection module in FIG. 4;

FIG. 8 is an exploded perspective view of a second embodiment of a drive unit in accordance with the teachings of the invention; and FIG. 9 is a perspective view of a third embodiment of the connection module.

DESCRIPTION OF THE PREFERRED EMBODIMENTS OF THE INVENTION

The drive unit illustrated in FIG. 1 essentially comprises an electric motor 10, an electrical connection module 12 and a reduction gear mechanism, the housing 14 of which is illustrated in FIG. 1 without its cover.

The motor 10 comprises a motor housing 16 having a cylindrical general shape, one axial end 18 of which is open to enable the introduction of the rotor 20, the output shaft 22 of which is axially extended by a shank 24, the free end of which comprises two consecutive sections 26A and 26B threaded in opposite directions.

The rotor 20 also comprises a commutator 28.

The reduction gear housing 14 is a part made by moulding in the general shape of a casing intended to receive on pins 30, as illustrated in FIG. 8, toothed pinions 29 which cooperate firstly with the worms 26A, 26B, and secondly with a driven wheel 32, the output shaft 34 of which passes through the cover 36 to drive a drive head of a windshield wiper (not represented).

The lateral wall 38 of the main part of the reduction gear housing 14 is transversally extended, i.e. in a direction parallel to the axis of rotation X—X of the rotor 20, by a connection part 40 which ends in a end plate 42.

The end plate 42, which is for example moulded integrally with the reduction gear housing 14, is a plate for connecting the reduction gear mechanism with the motor 10, and it closes the open axial end 18.

For this purpose the flange 43 of the motor housing 16 is designed to be housed in a complementary seat 44 in the end plate 42 and the attachment between these two elements is provided by means of screws 46, for example.

As can be seen in FIGS. 1 and 2, the end plate 42 is in the form of a solid partition 18 in which are formed firstly a window 50 and secondly an aperture 52.

The window 50 has a general rectangular shape and opens outside the housing 14 and its connection part 40, whereas the aperture 52 opens inside the housing 14 to the right of a housing 54 formed as a recess in the base 56 of the housing 14.

In the embodiment illustrated in FIGS. 1 to 3, the means for fixing the drive unit, for example on to a structural component of a motor vehicle, are integral with the bottom 56 of the housing 14.

The first embodiment of the connection module 12 illustrated in FIGS. 1 and 4 to 7 will now be described in detail.

The module 12 is essentially formed by a connection plate 60 produced by moulding from insulating plastics material.

The plate 60 has a general disk shape drilled at its centre with a hole 62 for the passage of the shaft 22.

The plate 60 comprises three holes 64 distributed angularly in a regular manner over its periphery to enable it to be fixed to the inside of the motor housing 16 in which are provided guide pins 19 inserted in the holes 64, and the heads of which are clinched after the positioning of the connection module 12.

The connection plate 60 is produced during a duplicate moulding operation around a metal connection structure made from conductive material (not represented in detail) which forms an electrical wiring circuit.

This structure in particular comprises pins 66 which transversally protrude from the lateral face 68 of the plate 60 to form electric contacts which are surrounded by a connector housing wall 70 integral with the plate 60.

The dimensions and the shape of the connector housing wall 70 are such that it can fit into the window 50, when the unit is in the mounted position, to form a connector accessible from the outside of the drive unit.

The drive unit also comprises means for detecting the position of at least one of the rotating components of the reduction gear mechanism, for example the driven wheel 32, in order to permit the actuation of the different reciprocating rotational movements of the windshield wiper.

These detection means comprise, in the embodiment illustrated in FIG. 1, a sensor 72 which comprises a sensor body 74 integral with the plate 60 and in which are embedded conductive electric blades 76 forming part of the metal structure of the connection module, the curved free ends 78 of which are designed to cooperate with conductive strips (not represented) formed for example on the upper face 33 of the driven wheel 32.

The base 80 of the connector body has a rectangular transversal section which is complementary to that of the aperture 52 in order to allow the introduction and passage of the sensor 72 inside the housing 14 in which it is held in the housing 54.

The electrical connection module 12 also comprises a blade-carrier plate 82.

The blade-carrier plate 82 is also made from insulating material in the form of a disk drilled in its centre with a hole 84 for the passage of the commutator 28 of the rotor 20.

The plate 82 bears, on its lateral face 86, elements 88 used to guide carbon brushes 90 which are provided to cooperate with the commutator 28 of the rotor 20.

The carbon brushes 90 are connected by wires 92 to parts 94, not covered in plastic material, of the conductive structure embedded in the connection plate 60.

In order to avoid the transmission of the noise of the friction of carbon brushes 90 on the commutator 28 to the drive unit, and in particular to the housings 16 and 14, the blade-carrier plate 82 is fixed to the connection plate 68 by four vibration dampers 96, which are made from elastomer material, for example.

The connection module 12, which has just been described in detail, therefore forms a particularly compact sub-unit, the assembly and production of which are performed independently of the assembly phases of the drive unit in the true meaning of the word, and which can be mounted in a very simple manner.

The assembly of the drive unit is in fact performed in the following way.

After having positioned the rotor 20 in the housing 20, the drive module 12 is placed inside the motor housing 16 with the carbon brushes 90 in place around the header 28.

The attachment of the connection module 12 can then be performed by crimping pins 19 which pass through the holes 64.

Assembly is performed by positioning the reduction gear housing 14 on the motor housing 16.

During this positioning operation, the connector body 70 extends into the window 50, the body 74 of the sensor 72 extends into the aperture 52 and the worm 24 extends, through hole 49, inside the housing 14.

The reduction gear housing 14 is then fixed on to the motor housing 16 by means of screws 46.

Assembly is performed in the conventional manner by positioning the different components of the reduction gear mechanism, such as the pinions 29 and the wheel 32, in the reduction gear housing 14, then by closing the reduction gear housing 14 with the cover 36.

If it is necessary to intervene, for example to perform a repair, on the reduction gear mechanism, it is noted that it is only necessary to open the reduction gear housing 14 without in any way interfering with the electrical connection means of the connection module 12.

The refinement illustrated in FIG. 8 will now be described, in which identical or similar components are designated by the same reference numbers as those used in FIGS. 1 to 7.

In this second embodiment, the body 74 of the sensor 72 is much shorter and on its upper face 75 comprises terminals 77.

In fact the sensor 72 is made in two parts, i.e. the first part 74 integral with the connection plate 60 of the connection module 12, and a second part 74' which comprises pins 77' provided to allow its connection to the terminals 77.

The body of the second part of the sensor 74' here comprises blades 76, the ends 78 of which cooperate with the strips on the upper face 33 of the driven wheel 32.

The assembly of the drive unit illustrated in FIG. 8 is performed in the same way as that of the unit illustrated in FIG. 1, the second part of the sensor 72 being positioned, after positioning the pinions 29 and the driven wheel 32, by the introduction of pins 77' into terminals 77.

The second part 74' of the sensor 72 is lodged and held in position in a housing 37 formed in the cover 36.

In this second embodiment of the drive unit illustrated in FIG. 8, the means for fixing the drive unit onto an element of the structure of the motor vehicle are integral with the cover 36.

The third embodiment of the connection module 12 illustrated in FIG. 9 differs from the preceding ones by the nature of the sensor 72 which here is an electromagnetic sensor of the Hall effect type.

The body of the sensor 74 may be made integraly by moulding with the connection plate 60 as in the two embodiments previously illustrated and described.

What is claimed is:

1. A drive unit for a windshield wiper in a vehicle, of the kind comprising an electric motor disposed in a motor housing open at one of its axial ends, and a blade-carrier support disposed inside the motor housing close to an open end of said housing, a reduction gear mechanism disposed in a reduction gear housing, one portion of which forms an end plate for closing the open end of the motor housing, and electrical connection means for the drive unit which comprise electric contacts accessible from outside the drive unit, wherein the electric contacts and the blade-carrier support are arranged in a connection module disposed inside the motor housing close to the open end thereof, and the end plate comprises a window open to the outside of the reduction gear housing and which extends opposite the electric contacts of the connection module.

2. A drive unit according to claim 1, wherein the electric contacts form part of an electrical connection element of the connection module, one lateral wall of which forms a connector housing and extends through the window in the end plate.

3. A drive unit according to claim 1, wherein the connection module comprises a sensor having a sensor body, wherein said sensor cooperates with a revolving member of the reduction gear mechanism and the sensor body of which is carried by the connection module.

4. A drive unit according to claim 3, wherein the end plate comprises a partition in which an aperture is formed for the passage of the body of the sensor.

5. A drive unit according to claim 3, wherein the sensor comprises conductive elements.

6. A drive unit according to any one of claims 1, 2 or 3 wherein the connection module comprises a connection plate made from insulating material.

7. A drive unit according to claim 6, wherein the connection plate is an intermediate plate disposed between the end plate and a parallel blade-carrier plate.

8. A drive unit according to claim 7, wherein the blade-carrier plate is fixed to the connection plate by vibration damping means.

9. A drive unit according to claim 6 wherein the connection plate comprises means for its attachment to the motor housing.

10. A drive unit according to claim 6, wherein the connection plate is made by moulding a plastic material.

11. A drive unit according to claim 10, wherein the electric contacts comprise inserts embedded during the moulding of the intermediate connection plate.

12. A drive unit according to claim 11 whenever appended to claim 2, wherein the connector housing is integral with the connection plate.

13. A drive unit according to claim 11 whenever appended to claim 3, wherein the body of the sensor is integral with the connection plate.

14. A drive unit according to claim 13 whenever appended to claim 5, wherein the conductive elements of the sensor are at least partially in the form of inserts embedded during the moulding of the sensor body.

15. A drive unit according to claim 14, wherein the conductive elements are conductive blades which extend transversally from the connection plate and which protrude into the reduction gear housing and the free ends of which cooperate with conductive strips formed on a radial face of the rotating member of the reduction gear mechanism.

16. A drive unit according to claim 3, wherein the sensor is an electromagnetic sensor.

17. A drive unit according to claim 3, wherein the sensor comprises a first sensor element borne by the connection module and a second sensor element, disposed inside the reduction gear housing and detachably fixed to the first sensor element.

* * * * *